UNITED STATES PATENT OFFICE.

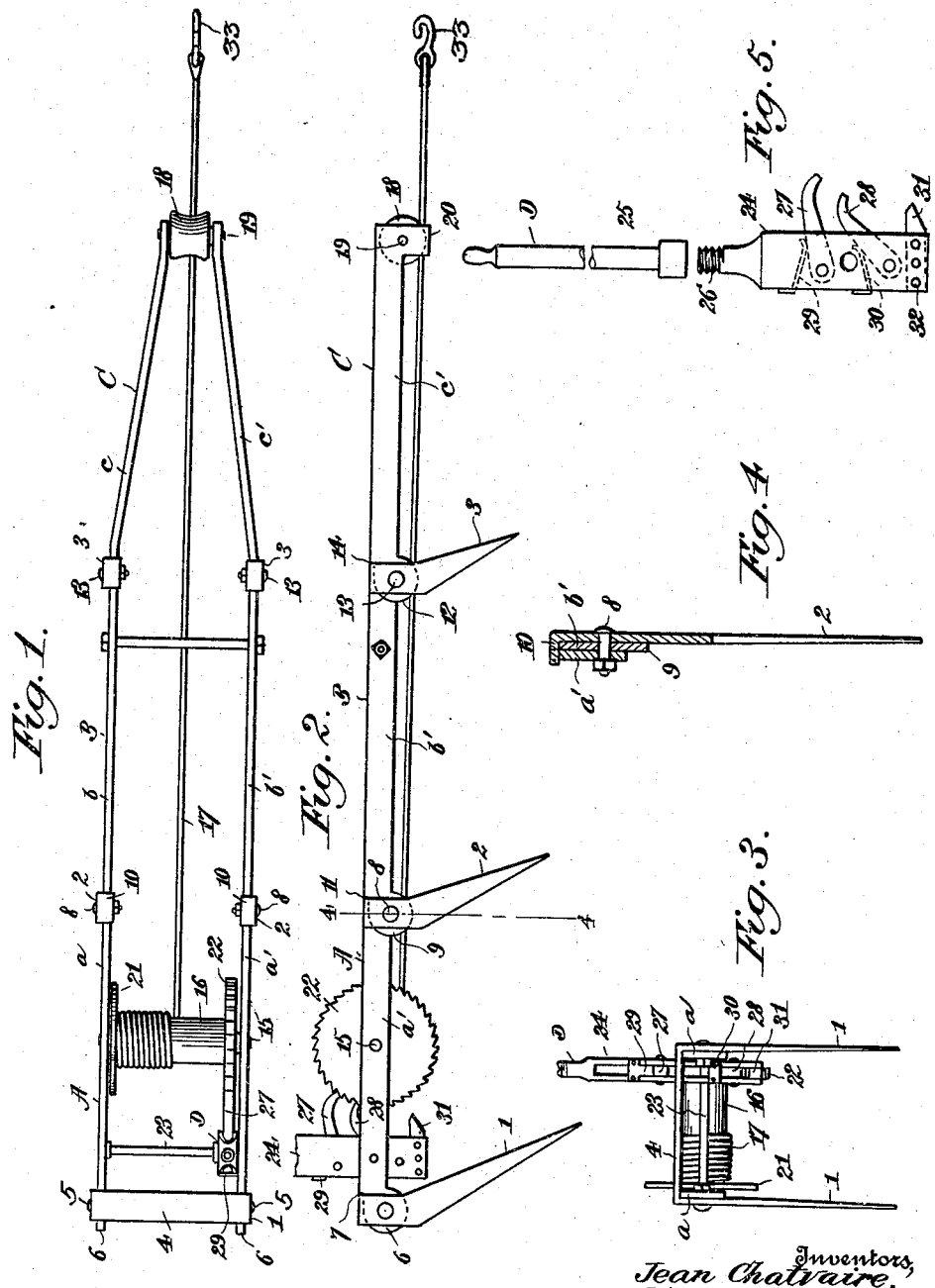

JEAN CHATVAIRE, PIERRE PROVOST, AND EMILE NAULT, OF LEGAL, ALBERTA, CANADA; SAID CHATVAIRE AND SAID NAULT ASSIGNORS TO OSCAR THEODORE ROSS AND GEORGE H. STODDART, BOTH OF EDMONTON, ALBERTA, CANADA.

AUTOMOBILE-PULLER.

1,200,409.  Specification of Letters Patent.  Patented Oct. 3, 1916.

Application filed September 11, 1915. Serial No. 50,250.

*To all whom it may concern:*

Be it known that we, JEAN CHATVAIRE, PIERRE PROVOST, and EMILE NAULT, subjects of the King of Great Britain, residing at Legal, in the Province of Alberta and Dominion of Canada, have invented new and useful Improvements in Automobile-Pullers, of which the following is a specification.

This invention relates to automobile pullers, the object in view being to produce a simple, light weight folding and portable device for extricating automobiles and motor vehicles in general from bad or miry places, the device also being useful for other purposes such as pulling stumps, stretching wire and the like.

One of the chief objects of the present invention is to produce a novel anchoring frame the parts of which are so connected together and related to each other as to adapt the whole frame to be compactly folded, the said frame embodying pivotally mounted and foldable anchoring spikes which are movable relatively to the main frame under certain conditions and held in fixed relation thereto when the frame is in its operative position and in actual use.

With the above and other objects in view, the invention consists in the novel construction, combination and arrangement of parts, as herein described, illustrated and claimed.

In the accompanying drawings, Figure 1 is a plan view of the complete device of this invention. Fig. 2 is a side elevation of the same. Fig. 3 is a rear end view thereof. Fig. 4 is a section on the line 4—4 of Fig. 2. Fig. 5 is a detail broken view of the sectional operating lever.

The frame of the device as a whole is made in three sections, A designating the rear section, B the intermediate section and C the forward section thereof.

The section A comprises the oppositely arranged and substantially parallel side bars $a$ and $a'$. The intermediate section B comprises the substantially parallel side bars $b$ and $b'$ and the section C of the frame comprises the forwardly converging side bars $c$ and $c'$, all of said bars being arranged in spaced relation to each other as shown in Fig. 1.

Pivotally mounted on the frame as a whole is a plurality of anchoring spikes 1, 2 and 3, the said spikes being arranged in pairs. The rearmost spikes 1 are connected together by an integral cross bar 4 as shown in Fig. 3 and the said rear spikes are pivotally connected at 5 to the bars $a$ and $a'$ which are terminally formed with rounded lugs 6 and also formed with stop shoulders 7 against which the connecting bar 4 bears when strain is put upon the frame as a whole, limiting the backward movement of the spikes 1 while permitting the same to be folded into parallel relation to the bars $a$ and $a'$ when the device is not in use.

The bars $a$ and $a'$ are pivotally connected to the bars $b$ and $b'$ at 8, the joint resembling an ordinary rule joint consisting of the rounded extremities 9 which overlap each other and which are pivotally connected by the pivot pin 8. Each of the spikes 2 is formed with a laterally extending lip 10 which coöperates with a stop shoulder 11 on the bars $b$ and $b'$ so as to properly hold the spikes 2 in working position. The bars $b$ and $b'$ are connected in the same way to the bars $c$ and $c'$ by means of the rule joints 12 the overlapping portions of which are pivotally connected together at 13, 14 designating shoulders against which the laterally projecting lips of the spikes 3 bear, the spikes 3 being formed in exactly the same manner as the spikes 2 but being somewhat shorter, it being preferred to progressively decrease the length of the spikes 1, 2 and 3 from the rear toward the front end of the frame.

Journaled on a rod or shaft 15 connecting the side bars $a$ and $a'$ is a drum 16 around which is wound a flexible cable 17 preferably of steel, the said cable being fastened to the drum 16 and extending forwardly around a guide roller 18 which is mounted to turn upon a shaft or bolt 19 extending through the down turned extremities 20 of the side bars $c$ and $c'$ of the frame. At one side the drum is provided with a cable holding flange 21 and at the other side said drum is provided with a ratchet wheel 22 which also performs the function of a cable retaining flange.

Mounted on a cross rod or bolt 23 arranged in rear of the drum 16 is an operating lever designated generally at D the same comprising a lower section 24 which is mounted directly on the rod or bolt 23, and one or more additional sections 25 which are preferably made of tubing as shown for the sake of lightness and adapted to be coupled together and detachably connected by means of a screw threaded joint as at 26. The lever D carries two pawls 27 and 28 arranged respectively above and below the rod or bolt 23 and normally pressed into engagement with the teeth of the ratchet wheel 22 by means of backing springs 29 and 30. In addition to the pawls 27 and 28, the lever D carries at its lower extremity a fixed detent 31 which is fixedly secured to the lever D as shown at 32.

From the foregoing description, taken in connection with the accompanying drawings, it will now be understood that when the frame is in its operative useful position, the sections A, B and C of the frame are in longitudinal alinement with each other and that they are in substantially parallel relation to the surface of the ground. When the sections of the frame are in such relation to each other, the spikes 1, 2, and 3 are held in a certain fixed relation to the remainder of the frame by means of the shoulders 7, 11 and 14 above referred to. The device as a whole is placed at a suitable distance from the object to be pulled and is provided at its extremity with an attaching device shown in the form of a hook 33 by means of which the cable 17 may be secured to such object. By now operating the lever D, the cable 17 is wound around the drum 16 and the first action thereof is to force the spikes 1, 2 and 3 into the ground, said spikes being inclined in a forward direction toward their extremities. By the double arrangement of the pawls 27 and 28, the drum 16 is turned evenly and during both the forward and rearward strokes of the lever D. This operation is continued until the vehicle or other object is drawn from its mired position. The device as a whole may be shifted from time to time if necessary until the machine or vehicle is resting upon solid ground.

When the device is not in use, the forward section C of the frame is folded under the intermediate section B and both of said sections B and C are then folded under the rear section A thereby forming a compact structure which is also light in weight and therefore may be stowed away in a vehicle until further needed. The detent 31 is brought into use by rocking the lever D to the extreme limit of its movement in a rearward direction where the drum will be locked, and if desired, the pawls 27 and 28 may be lifted out of engagement with the ratchet wheel 22. Upon rocking the lever D in the opposite direction the drum is of course released.

Having thus described our invention, we claim:

1. In a device of the class described, a frame embodying pivotally connected sections adapted to be folded into substantially parallel relation to each other and to be brought into longitudinal alinement with each other, the said sections comprising oppositely arranged side bars in spaced relation to each other, the said side bars being connected together by rule joints formed to provide stop shoulders and anchoring spikes pivotally connected to the frame in line with the pivot points of the rule joints and coöperating with said shoulders to maintain a fixed relation between the frame and spikes, a flexible cable, a drum on which said cable is adapted to be wound, and means for turning said drum.

2. In a device of the class described, a frame comprising a plurality of sections foldable in relation to each other and each embodying side bars arranged in spaced relation to each other, the side bars of adjacent sections being pivotally connected together by rule joints and the extremities of the bars of one section being formed with disk-shaped lugs and stop shoulders, anchoring spikes pivotally mounted on said frame bars on axes coincident with the axes of the rule joints and provided with laterally extending lips to engage the shoulders of the side bars formed by providing the rule joints therein, other anchoring spikes at the rear end of the frame pivotally mounted on said disk shaped lugs, a cross bar connecting the last named spikes and coöperating with the shoulders provided by the formation of said lugs, a flexible pulling cable, a drum for said cable, a manually operated lever, and pawl and ratchet mechanism connecting said drum and operating lever.

In testimony whereof we affix our signatures in presence of two witnesses.

JEAN CHATVAIRE.
PIERRE PROVOST.
EMILE NAULT.

Witnesses:
  GEO. S. MONTGOMERY,
  GEO. S. MONTGOMERY, Jr.

Copies of this patent may be obtained for five cents each, by addressing the "Commissioner of Patents, Washington, D. C."